(12) United States Patent
Delozier II et al.

(10) Patent No.: US 6,596,176 B1
(45) Date of Patent: Jul. 22, 2003

(54) POTABLE WATER TREATABLE PROCESS USING HYDROGEN PEROXIDE AND METALLIC COAGULANT

(76) Inventors: Gerald Edward Delozier II, P.O. Box 452320, Grove, OK (US) 74345; Kenneth Wayne Farris, 9412 Carrington Way, Fort Smith, AR (US) 72903; Larry Don Casey, Route 2, Box 81-5, Pryor, OK (US) 74361

(*) Notice: Subject to any disclaimer, the term of this patent is extended or adjusted under 35 U.S.C. 154(b) by 0 days.

(21) Appl. No.: 09/893,180

(22) Filed: Jun. 26, 2001

(51) Int. Cl.[7] .............................. C02F 1/54; C02F 1/56; C02F 1/72
(52) U.S. Cl. .................. 210/721; 210/727; 210/732; 210/734; 210/759
(58) Field of Search ............................ 210/721, 723, 210/726, 727, 729, 732, 733, 734, 758, 759, 763, 764, 908

(56) References Cited

U.S. PATENT DOCUMENTS

| | | | |
|---|---|---|---|
| 4,219,418 A | * 8/1980 | Pilon | 210/717 |
| 4,347,141 A | * 8/1982 | Rothberg | 210/721 |
| 4,454,047 A | * 6/1984 | Becker et al. | 210/705 |
| 5,043,080 A | 8/1991 | Cater et al. | 210/748 |
| 5,118,426 A | * 6/1992 | Duncan et al. | 210/721 |
| 5,639,379 A | * 6/1997 | Stogner, Jr. | 210/727 |
| 5,716,528 A | 2/1998 | Jasim et al. | 210/668 |
| 5,807,486 A | * 9/1998 | Busch, Jr. | 210/638 |
| 5,817,240 A | 10/1998 | Miller et al. | 210/759 |
| 5,840,194 A | * 11/1998 | Yokose et al. | 210/710 |
| 5,914,040 A | * 6/1999 | Pescher et al. | 210/638 |
| 6,024,882 A | 2/2000 | McNeilly et al. | 210/759 |
| 6,083,404 A | * 7/2000 | Sommese et al. | 210/723 |
| 6,245,121 B1 | * 6/2001 | Lamy et al. | 71/1 |
| 6,398,968 B1 | * 6/2002 | Higby | 210/721 |
| 6,409,926 B1 | * 6/2002 | Martin | 210/709 |
| 6,416,668 B1 | * 7/2002 | Al-Samadi | 210/636 |

FOREIGN PATENT DOCUMENTS

| | | | |
|---|---|---|---|
| EP | 0661238 | * | 7/1995 |
| FR | 2689492 | * | 10/1993 |
| GB | 2056962 | * | 3/1981 |
| WO | WO 99/21801 | * | 5/1999 |

\* cited by examiner

Primary Examiner—Fred Prince
(74) Attorney, Agent, or Firm—Keisling & Pieper PLC; Trent C. Keisling; David B. Pieper

(57) ABSTRACT

A process for the purification of water includes the addition of hydrogen peroxide and metallic coagulants in order to remove organic contaminants. Metallic coagulants increase the oxidative activity of hydrogen peroxide, while also causing the oxidized by-products to coagulate. The method is suitable for use in existing water treatment facilities. Optionally, an anionic polymer may also be added to enhance coagulation of the oxidized contaminants.

14 Claims, 1 Drawing Sheet

POTABLE WATER TREATABLE PROCESS USING HYDROGEN PEROXIDE AND METALLIC COAGULANT

BACKGROUND OF THE INVENTION

1. Field of the Invention

The present invention relates generally to methods for treating water so that it is suitable for subsequent human consumption. More particularly, the invention provides an inexpensive and convenient method for lowering quantities of organic contaminants in water during treatment. The invention can be adopted by conventional water treatment facilities without the need for significant modification to existing equipment and process.

2. Prior Art

Very few water sources supply water that is clean enough for human consumption without any treatment, such as clarification, disinfection, decontamination and sanitation, etc. Practically all water from natural sources is contaminated with organic compounds and microorganisms that must be removed for a variety of reasons. Organic compounds often cause unpleasant odors and unappealing discoloration of the water. More importantly, some microorganisms and organic compounds are harmful to humans and inefficient removal can cause sickness and disease throughout an entire community. In recent years many regulatory agencies and particularly the United States Environmental Protection Agency (E. P.A.) have begun requiring water treatment plants to meet increasingly higher standards for the water they treat.

A number of methods are used to remove organic contaminants from water sources. The most popular recent treatment has been chlorination, the addition of chlorine to water, which has been used extensively throughout the United States and in many other countries. It is cheap, easy and highly effective. However, chlorination is gradually losing favor with the E.P.A. and health organizations for many reasons. One increasingly important factor is the potential adverse health impact of chlorination. It has been discovered that chlorination can lead to the formation of toxic and carcinogenic Disinfection by-Products (DBP's) such as chloroform and haloacidic acids. As a consequence of the increasing disenchantment with chlorination, the use of chlorine by water treatment plants is becoming more restrictive so a need has arisen for an alternative treatment that is safer yet still economical comparative to the use of chlorine and other halogens as disinfectants.

Ultraviolet radiation has been used successfully as an alternative to chlorine. Water is exposed to ultraviolet light which kills pathogens. Unfortunately, UV light can not penetrate water beyond a few centimeters. This means that for UV radiation to be effective, expensive and elaborate systems must be added to existing water treatment facilities. The UV irradiating equipment is also expensive to operate. Many water treatment plants find the expense of UV radiation to be prohibitive.

Another recently developed alternative to chlorination is oxidation. Strong oxidants effectively destroy organic contaminants while typically leaving harmless by-products. Many pathogens are destroyed and most organic compounds are fully oxidized when untreated water is oxidized. Ozone has been a popular oxidant in this emerging technology. However, ozone must be produced on site, often created immediately prior to injection into the contaminated water. This makes the use of ozone expensive. It also requires existing plants to install new, expensive machinery and is therefore unappealing to many water treatment facilities. Other strong oxidants may be used, but many result in undesirable DBP's. Bromate, a suspected carcinogen, is known to form when water is treated with strong oxidants.

The above methods share one quality in that they create an unduly hazardous work environment. Chlorine is toxic to humans as well as microorganisms. UV radiation causes cancer and blindness. Ozone and other strong oxidizing agents are also harmful to humans and must be handled carefully. Thus, the need for alternative treatments has continued.

Hydrogen peroxide, a milder oxidant than ozone and chloride, can also be used to oxidize untreated and contaminated water. However, hydrogen peroxide, although cheap, degrades rapidly and it has been found insufficient by itself to adequately decontaminate water. Hydrogen peroxide has been combined with ozone, UV radiation, filters and ferrous iron in attempts to boost its reactivity. These additions add significantly to the cost of the treatment process. The use of ferrous iron can result in the formation of iron oxide which must itself be removed in the treatment process. Thus, a need exists for an improved treatment process.

Recently, there have been many attempts to develop improved methods of oxidation for the treatment of drinking water. U.S. Pat. No. 6,024,882 to McNeilly et al., describes a method of using a combination of hydrogen peroxide and ozone to decontaminate water. Oxidizable contaminants in water are destroyed by exposing water to oxidizing conditions under pressure. High intensity mixing of the hydrogen peroxide, ozone and water under pressure facilitates complete oxidation of the contaminants with minimal waste of undissolved ozone. In this method, bromate formation is suppressed by maintaining a concentration of hydrogen peroxide that is greater than the concentration of ozone. This method, however, requires careful, continual monitoring of ozone and hydrogen peroxide concentrations in the treated water. In addition, this method does not avoid the increased expenses of using ozone. In order to adopt this method, existing water treatment facilities would need to install not only ozone producing equipment, but also ozone monitoring equipment.

U.S. Pat. No. 5,043,080 to Cater, et al., describes a method of using hydrogen peroxide and metal ions in conjunction with ultraviolet radiation. In addition to its disinfecting qualities, ultraviolet radiation has also been found to enhance the oxidation activity of hydrogen peroxide. However, this method avoids neither the significant cost nor danger using of ultaviolet radiation.

U.S. Pat. No. 5,716,528 to Jasim et al., describes a water treatment method consisting of the addition of hydrogen peroxide and ferrous ions at an acidic pH and subsequent filtration through activated carbon. Although this method uses neither chlorine, a strong oxidant, or ultraviolet radiation, it requires the installation and use of an activated carbon filter. Existing water treatment facilities would need to install, at significant cost, filtration systems.

U.S. Pat. No. 5,817,240 to Miller et al., describes a method of using hydrogen peroxide to treat water. Oxidation activity of hydrogen peroxide is enhanced by passing the treated water over a filter or fixed bed after the addition of hydrogen peroxide. The filter or fixed bed contains metal ions that enhance the activity of hydrogen peroxide. As with the previous patent, this method would require water treatment facilities to install either a filtration system or additional reservoirs in which fixed beds would have to be installed. The maintenance as well as the initial installation costs of either a filtration system or a fixed bed reservoir is unappealing to existing water treatment plants.

It is therefore an object of this invention to provide a method for treating water that is inexpensive and easy to perform while obtaining adequate treatment results.

Another object of this invention to provide a method for decontaminating water that can be readily adapted to conventional water treatment facilities without the need for additional equipment or significant changes to conventional treatment processes or adversely affecting conventional facility production capability.

Another object of this invention to provide a method for treating water that uses safer, less harmful chemicals, thereby promoting a safer work environment for employees of water treatment facilities.

Another object of this invention to provide a method for treating water that consists of a combination of known additives that are already approved by the regulatory agencies.

Another object of this invention to provide a method for treating water that results in reduced amounts of DBP's, microorganisms, organic compounds, halomethanes, haloacidic acids, unpleasant tastes and odors, iron and manganese.

SUMMARY OF THE INVENTION

The present invention combines the use of hydrogen peroxide and metallic coagulants. The combination of these compounds creates a synergistic effect that enhances the disinfectant activity of hydrogen peroxide and promotes coagulation of the oxidized contaminants. This unexpected synergistic effect destroys pathogens and organic contaminants. The oxidized contaminants then coagulate and may be filtered out or allowed to settle out of the water. Filtration and sedimentation methods that effectively remove coagulated contaminants are well known in the art of water purification. An anionic polymer may also be added to enhance coagulation. The invention produces no unpleasant odors or coloration, avoids formation of harmful DBP's and adequately disinfects the treated water. The invention does not introduce halogens or ferrous ions to the treated water. Another advantage of this invention is that it may be readily adapted to existing water treatment facilities. The chemicals used are relatively cheap and safe to handle.

In the present invention, water is pumped from a water source to a water treatment facility. The pipeline contains at least two injection points at which chemicals may be injected directly into the untreated water. At the first injection point, concentrated hydrogen peroxide is added. The hydrogen peroxide immediately begins oxidizing microorganisms and organic compounds in the water. Further downstream metallic coagulants are injected into the untreated water. These coagulants have a catalytic effect on the hydrogen peroxide, enhancing oxidation of organic contaminants. In addition to this synergistic effect, the coagulants initiate the coagulation process.

If desired, the coagulation process may be enhanced by the addition of anionic polymers at an injection point further downstream of the coagulant injection point. Whether anionic polymers will be added will depend on a variety of factors known to those skilled in the art of water purification. These factors may include but are not limited to the types of contaminants found in the water, the concentrations of various contaminants in the water, the specific coagulant used, and the types of additional treatments that the water will undergo at the treatment facility.

The present invention offers significant improvements over existing water treatment processes. The use of hydrogen peroxide in combination with metallic coagulants is cheap, safe, and easily applied to existing treatment facilities. The invention is also a significant improvement over similarly safe methods such as the one described in U.S. Pat. No. 5,817,240 to Miller et al. Unlike the Miller patent, the present invention does not require the addition of a filter or fixed bed. In addition, the metallic catalyst used in the present invention also serves as a coagulant. While the Miller patent would require the addition of a coagulant, the metals used in the present invention double as both catalysts and coagulants. The present invention is therefore, cheaper, more efficient and faster.

Water treated in the method described by the present invention continues down the pipeline to a water treatment plant. At the plant water may be further treated as required by the types of contaminants found in the water. These treatments are well known to those skilled in the art of water purification and may include but are not limited to sedimentation, filtration, clarification, softening, aeration and desalination.

DETAILED DESCRIPTION OF THE PREFERRED EMBODIMENTS

Figure 1:
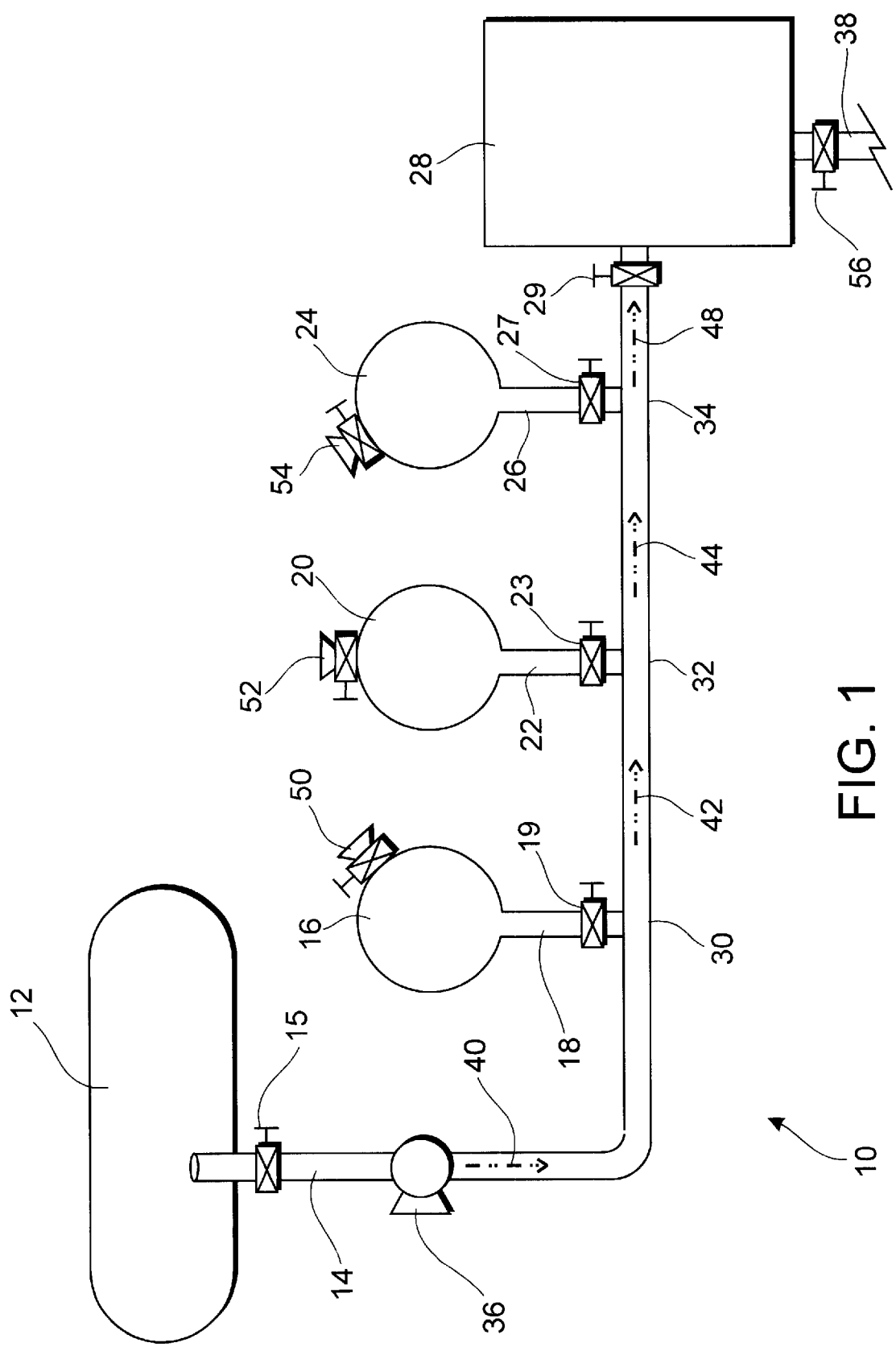
FIG. 1 shows a schematic representation of an exemplary embodiment of a potable water treatment process using hydrogen peroxide and metallic coagulant.

The present invention combines the use of hydrogen peroxide and metallic coagulants. The combination of these compounds creates a synergistic effect that enhances the disinfectant activity of hydrogen peroxide and promotes coagulation of the oxidized contaminants. This unexpected synergistic effect destroys pathogens and organic contaminants. The oxidized contaminants then coagulate and may be filtered out or allowed to settle out of the water. An anionic polymer may also be added to enhance coagulation. The invention produces no unpleasant odors or coloration, avoids formation of harmful DBP's and adequately oxidizes the treated water. Another advantage of this invention is that it may be readily adapted to existing water treatment facilities. The chemicals used are relatively cheap and safe to handle.

In the present invention, Water treatment system 10 is used to treat water prior to reaching water treatment plant 28. Water is pumped by water pump 36 from an untreated water source 12 through inlet valve 15 and pipeline 14 in the direction of directional arrow 40 to a water treatment facility 28. Depending on the particular water treatment plant, pump 36 may be located anywhere along pipeline 14. It may also be desirable to include multiple pumps along pipeline 14, depending on the design of the treatment system. Those skilled in the art of designing water treatment facilities will appreciate that the pumping needs of a plant depend on a variety of factors. The pipeline 14 contains at least two injection points at which chemicals may be injected directly into the untreated water. At the first injection point 30, concentrated hydrogen peroxide stored in a reservoir 16 is added to the water in the pipeline by injection tube 18. Hydrogen peroxide is added to reservoir 16 through inlet valve 50. Release of the hydrogen peroxide is regulated by valve 19. The hydrogen peroxide solution may vary, however the final concentration of hydrogen peroxide in the water being treated should range from 0.1 to 10 milligrams per liter (mg/L), preferably 1 mg/L. The hydrogen peroxide immediately begins oxidizing microorganisms and organic compounds in the water.

The water being treated continues to flow through pipeline 14 in the direction of directional arrow 42. Further downstream metallic coagulants from reservoir 20 are injected into the treated water through injection tube 22 at injection point 32. The metallic coagulant is added to reservoir 20 through inlet valve 52. The release of the coagulant is regulated by valve 23. The coagulant used is a metal salt blended with polydimethyldiallylammonium chloride (DADM). The ratio of metal salt to DADM within the coagulant blend may range from 10:1 to 1:5. Preferably, the metallic coagulant is a blend of about 6 parts aluminum sulfate to 1 part DADM.

The coagulant blend is dissolved in sulfuric acid and maintained in reservoir 20 as a concentrated solution. Sulfuric acid is the preferred solvent, but a variety of other solvents are also sufficient for use in the invention. Other acids are especially good solvents. However, many other acids, such as hydrochloric acid and nitric acid introduce undesirable chemicals, namely nitrates and halogens. Water is also a suitable solvent, but is less effective than an acidic solvent.

The concentration of the coagulant in the water undergoing treatment should range from 1 to 300 mg/L. The preferred dosage of the metal coagulant is about 100 mg/L. This coagulant has a catalytic effect on the hydrogen peroxide, enhancing oxidation of organic contaminants. In addition to this synergistic effect, the coagulants initiate the flocculation process. The metallic coagulant requires only a short period of time to react with the water being treated. Within 30 to 60 seconds the metallic coagulant, in combination with the hydrogen peroxide, will effectively oxidize organic contaminants in water. For water having especially high concentrations of contaminants, it may prove prudent to extend this time, as will be appreciated by those skilled in the art.

Appropriate metal salts include aluminum sulfate, ferrous sulfate, aluminum chloride, ferrous chloride, aluminum chlorohydrate and ferrous chlorohydrate. Aluminum sulfate is the preferred metal salt. However any of the above listed metal salts may be used. To avoid the risk of contaminating the treated water with ferrous oxide, it is usually desirable to use aluminum salts. It is likely that other metal sulfates, chlorides and chlorohydrates will also be suitable for the present invention.

After addition of the metallic coagulant, the water being treated continues to flow through pipeline 14 in the direction of directional arrow 44. If desired, the flocculation process may be enhanced by the addition of anionic polymers. These polymers are stored in reservoir 24 and may be added at injection point 32 by injection tube 26 at injection point 34, which is further downstream from injection point 32. Anionic polymers are added to reservoir 24 through inlet valve 54. The addition of anionic polymers to the water being treated is regulated by valve 27. Whether anionic polymers will be added will depend on a variety of factors known to those skilled in the art of water purification. These factors may include but are not limited to the types of contaminants found in the water, the concentrations of various contaminants in the water, the specific coagulant used, and the types of additional treatments that the water will undergo at the treatment facility.

The preferred anionic polymer is anionic polyacrylamide in a water-in-oil emulsion. However, any National Sanitation Foundation (NSF) approved anionic polymer will be effective. The final concentration of polymer in the water being treated should be from 0.01 to 2 mg/L, preferably about 1 mg/L. As with the metallic coagulant, relatively little time is required for the anionic polymer to react with the water being treated. Between 10 and 60 seconds is usually sufficient. Like the metallic coagulant, this time period may need to be extended under certain conditions that will be recognized by those skilled in the art.

Water treated in the method described by the present invention continues down the pipeline 14 in the direction of directional arrow 48. The treated water then passes through outlet valve 29 and into water treatment plant 28. Valves 29 and 15 work in conjunction to regulate the flow of water through pipeline 14. Those skilled in the art will appreciate that, depending on the design of the water treatment system, it may be desirable in include additional flow regulating valves along pipeline 14.

The water reaching the treatment plant is disinfected and the contaminants will have begun to coagulate. At the plant water may be further treated as required by the types of contaminants found in the water. These treatments are well known to those skilled in the art of water purification and may include but are not limited to sedimentation, filtration, clarification, disinfection, softening, aeration and desalination. The coagulated contaminants, including the coagulant itself and any added polymer, may be removed by any of the methods that are well known in the art, such as filtration, sedimentation or the like. There is no need to remove the hydrogen peroxide as it degrades into water. Finally, potable water is released from water treatment plant 28 through outlet pipeline 38. The release of potable water is regulated by valve 56.

The injection points 30, 32 and 34 may simply be points at which pipeline 14 intersects tubes 18, 22 and 26 respectively. Alternatively, these injection points may be comprised of any of a variety of mixing systems known to those skilled in the art, such as a venturi, high pressure injection nozzles or the like. The present invention is effective so long as the added compounds are adequately mixed with the water to be treated.

Whereas, the present invention has been described in relation to the drawings attached hereto, it should be understood that other and further modifications, apart from those shown or suggested herein, may be made within the spirit and scope of this invention.

What is claimed is:

1. A method for treating water to be made potable, comprising the addition of hydrogen peroxide and the addition of a metallic coagulant to untreated water entering a potable water treatment system and before being treated in the system, said metallic coagulant being added to said untreated water subsequent to the addition of said hydrogen peroxide and wherein said metallic coagulant is comprised of between 1 to 10 parts polydimethyldiallylammonium chloride and between 1 to 5 parts a metal salt.

2. A method for treating water according to claim 1 wherein said metallic coagulant is comprised of about 6 parts polydimethyldiallylammonium chloride and about 1 part aluminum sulfate.

3. A method for treating water according to claim 1 further comprising the addition of an anionic polymer to the untreated water and wherein said anionic polymer is anionic polyacrylamide in a water-in-oil emulsion.

4. A method for treating water to be made potable comprising the addition of hydrogen peroxide and the addition of a metallic coagulant to untreated water, said metallic coagulant being added to said untreated water subsequent to the addition of said hydrogen peroxide, wherein the concentration of said hydrogen peroxide is between 0.1 and 10 mg/L and the concentration of said metallic coagulant is between 1 and 300 mg/L and wherein said metallic coagulant is comprised of polydimethyldiallylammonium chloride and a metal salt.

5. A method for treating water according to claim 4 wherein said metallic coagulant is comprised of between 1 to 10 parts polydimethyldiallylammonium chloride and between 1 to 5 parts a metal salt.

6. A method for treating water according to claim 4 wherein the metal salt is selected from the group consisting of aluminum sulfate, ferrous sulfate, aluminum chloride, ferrous chloride, aluminum chlorohydrate and ferrous chlorohydrate.

7. A method for treating water according to claim 4 wherein said metallic coagulant is comprised of about 6 parts polydimethyldiallylammonium chloride and about 1 part aluminum sulfate.

8. A method for treating water according to claim 4 further comprising the addition of an anionic polymer to the untreated water subsequent to the addition of hydrogen peroxide and the addition of a metallic coagulant to untreated water and wherein said anionic polymer is anionic polyacrylamide in a water-in-oil emulsion.

9. A method for treating water to make it potable comprising the addition of hydrogen peroxide, a metallic coagulant and an anionic polymer to untreated water in an initial series prior to its introduction into a potable water treatment system, said metallic coagulant being added to said untreated water subsequent to the addition of said hydrogen peroxide, wherein the concentration of said hydrogen peroxide is between 0.1 and 10 mg/L and the concentration of said metallic coagulant is between 1 and 300 mg/L and wherein said metallic coagulant is comprised of polydimethyldiallylammonium chloride and a metal salt.

10. A method for treating water according to claim 9 wherein said metallic coagulant is comprised of between 1 to 10 parts polydimethyldiallylammonium chloride and between 1 to 5 parts a metal salt.

11. A method for treating water according to claim 9 wherein the metal salt is selected from the group consisting of aluminum sulfate, ferrous sulfate, aluminum chloride, ferrous chloride, aluminum chlorohydrate and ferrous chlorohydrate.

12. A method for treating water according to claim 9 wherein said metallic coagulant is comprised of about 6 parts polydimethyldiallylammonium chloride and about 1 part aluminum sulfate.

13. A method for treating water according to claim 12 wherein said anionic polymer is added subsequent to the addition of said metallic coagulant.

14. A method for treating water according to claim 12 wherein said anionic polymer is anionic polyacrylamide in a water-in-oil emulsion.

* * * * *